US012393589B2

(12) United States Patent
Purnell

(10) Patent No.: US 12,393,589 B2
(45) Date of Patent: Aug. 19, 2025

(54) AUTOMATED COMPLAINT HOTLINE PROCESSING SYSTEM AND METHOD WITH PRIVACY PROTECTION AND COMPUTERIZED ANALYTICS

(71) Applicant: Anonymous Coach, Inc., Green Village, NJ (US)

(72) Inventor: Timothy Purnell, Morristown, NJ (US)

(73) Assignee: ANONYMOUS COACH, INC., Green Village, NJ (US)

( * ) Notice: Subject to any disclaimer, the term of this patent is extended or adjusted under 35 U.S.C. 154(b) by 0 days.

(21) Appl. No.: 18/672,897

(22) Filed: May 23, 2024

(65) Prior Publication Data

US 2024/0311376 A1    Sep. 19, 2024

Related U.S. Application Data

(62) Division of application No. 17/845,016, filed on Jun. 21, 2022, now Pat. No. 12,254,010.

(Continued)

(51) Int. Cl.
*G06Q 30/00*    (2023.01)
*G06F 16/23*    (2019.01)
(Continued)

(52) U.S. Cl.
CPC ...... *G06F 16/2455* (2019.01); *G06F 16/2372* (2019.01); *G06F 21/6245* (2013.01); *G06Q 50/182* (2013.01)

(58) Field of Classification Search
CPC ............. G06F 16/2455; G06F 16/2372; G06F 21/6245; G06Q 50/182; G06Q 50/26
See application file for complete search history.

(56) References Cited

U.S. PATENT DOCUMENTS

2003/0163483 A1*  8/2003  Zingher ................. G06Q 10/10
2017/0270627 A1*  9/2017  Hodge ................ H04M 3/2281
(Continued)

OTHER PUBLICATIONS

Hotline Processing System and Method with Privacy Protection and Computerized Analytics, Global IP News. Information Technology Patent News New Delhi: Pedia Content Solutions Pvt. Ltd. (Dec. 28, 2022). (Year: 2022).*

(Continued)

*Primary Examiner* — Matthew T Sittner
(74) *Attorney, Agent, or Firm* — Cowan, Liebowitz & Latman, P.C.; Mark Montague; Daniel Basov

(57) ABSTRACT

Automated system and method for processing online idea submissions (with crowdsourcing and anonymity functions), formal complaints and anonymous complaints. The system receives and processes registration information, creates a unique coding entry, and generates an associated keyword database. When the system receives input data from a user, it utilizes the unique coding identifier to relate to the organization, searches the keyword database in any communications involving the registered entity, automatically analyzes the received data, and preforms a zone of reliability verification analysis on the received data. The system also removes private personal information (PPI) for anonymous users, and "locks" and/or encrypts the version with PPI, preventing unauthorized access, and unseals the dataset with PPI information only after receipt of an unsealing order from a court or a governmental entity. The system also automatically generates and transmits reports to governmental entities and others based on the analysis of the reported complaints and legal requirements and guidelines. The system also calculates and utilizes a rating score as part of the engagement process with the registered entity, performs analysis and reporting of the overall industry, and connects (Continued)

the entity with the experts in the area of concern based on the analysis.

16 Claims, 5 Drawing Sheets

Related U.S. Application Data

(60) Provisional application No. 63/213,101, filed on Jun. 21, 2021.

(51) Int. Cl.
*G06F 16/2455* (2019.01)
*G06F 21/62* (2013.01)
*G06Q 50/18* (2012.01)

(56) References Cited

U.S. PATENT DOCUMENTS

| | | | |
|---|---|---|---|
| 2019/0042548 A1* | 2/2019 | Peoples | G06F 16/70 |
| 2019/0130414 A1* | 5/2019 | Ellis | G06Q 30/016 |
| 2023/0360146 A1* | 11/2023 | Ketharaju | G06Q 50/01 |

OTHER PUBLICATIONS

Essays on U.S. Data Protection Law & Policy, Kesari, Aniket. ProQuest Dissertations and ThesesProQuest Dissertations & Theses. (2020). (Year: 2020).*

Negotiating Feminism: Campus Sexual Violence and the Politics of Settlement, Del Gobbo, Daniel. ProQuest Dissertations and ThesesProQuest Dissertations & Theses. (2021) (Year: 2021).*

* cited by examiner

It's Anonymous
COMPETITION

| | 510<br>It's Anonymous | 520<br>Whistleblowers Hotlines | 530<br>NYAS:<br>Report-A-Coach | 540<br>U.S. Center for<br>SAFESPORT | 550<br>OSHA |
|---|---|---|---|---|---|
| 562 — Process for Reporting | 🔔 | 🔔 | 🔔 | 🔔 | 🔔 |
| 565 — Completely Anonymous | 🔔 | | | | |
| 566 — DEI FOCUS | 🔔 | | | | |
| 564 — Promotes Healthy Environments | 🔔 | 🔔 | 🔔 | 🔔 | 🔔 |
| 568 — Leadership Tool for Crowd Sourcing/Innovation | 🔔 | | | | |
| 569 — SaaS | 🔔 | | | | |

FIG. 5

AUTOMATED COMPLAINT HOTLINE PROCESSING SYSTEM AND METHOD WITH PRIVACY PROTECTION AND COMPUTERIZED ANALYTICS

REFERENCE TO RELATED APPLICATION

This application is a divisional of U.S. patent application Ser. No. 17/845,016, filed on Jun. 21, 2022, which claims priority to U.S. provisional patent application No. 63/213, 101, filed on Jun. 21, 2021, both of which are incorporated herein by reference in their entirety.

FIELD OF THE INVENTION

The present invention relates to automated and computerized analytics processing in the areas of hotline and anonymous complaint processing, and particularly relates to these areas in students and learning institutions realms. More particularly, the present invention pertains to the automated modeling, identification, determination and analysis of complaints and cross-referencing related complaints, automated and semi-automated software-driven decision making, follow-up processing of complaints and automated connection with relevant investigatory agencies, protection of privacy and maintaining anonymity of callers, separation of privacy data from non-private data that can be shared with others, such as the relevant authorities, and generation of analytics and matrices to determine the growth or reduction of specific types of complaints or determined problems.

BACKGROUND OF THE INVENTION

Over the many years, companies and learning institutions (e.g., universities) have developed policies and procedures to protect students from harassment, intimidation, bullying, inappropriate sexual behavior, and other identified potential harms. Many organizations implement complaint hotlines and assistance groups to help facilitate those policies and procedures.

However, many institutions, such schools, athletic teams, and companies, use their own personnel to collect, analyze, and report the complaints, most of which is from students, parents, athletes, etc. This approach has been criticized as being non-objective, unfair and simply incapable technique for instituting appropriate measures. In certain high-publicity cases, the organization-implemented hotlines and complaint processing has basically suppressed the complaints, often since they are deemed to be potentially damaging to the institution or the applicable team.

There are powerful forces in many organizations that cause the widespread withholding of information about potential problems or issues, as reported in 2000 by the Morrison and Milliken study "Organizational Silence: A Barrier to Change and Development in a Pluralistic Work" (www.jstor.org/stable/259200?seq=1). Among other problems, these organizational barriers promote exclusivity and marginalize the voice of employees. Organizations often do not hear "what needs to be said" and "what is not being said." This restricts and limits the potential benefits to organizations, such as cost/savings and new revenue streams. It also creates higher risks of various legal actions against the company, many of which are highly damaging to reputation, including allegations of racism, agism and sexism, harassment, intimidation in the workplace environment, furthering disparity and inequality.

In many settings and organizations, open discussions of the potential or existing problems are considered "uncomfortable" and may sometimes fall victim to the more dominant forces that promote company stability and status quo. Employees with a potential "gem of idea" may feel uncomfortable or afraid to speak up for fear of not being taken seriously or failure in accomplishing any meaningful changes. These, and other obstacles, may be further compounded by a remote working environment, where there are fewer in-person discussions.

An independent report uncovered a lack of any action by Louisiana State University (LSU) when it received complaints about its football coach. This enabled its head football coach, Les Miles, to continue management practices that were abusive, illegal and in clear violation of the college's hiring guidelines and many of its regulations. The lack of proper response and action by the institution—to the numerous anonymous complaints—were documented in an independent report and mentioned by Dan Wetzel in the article "Why did LSU allow Les Miles to carry on? 'We're protecting our brand'," which was published on Mar. 10, 2021, in the Yahoo online Sports section (https://sports.yahoo.com/why-did-lsu-allow-les-miles-to-carry-on-nobody-wanted-to-rock-the-boat-221807508.html).

Another example of the typical failure, or lack of an objective and comprehensive complaint-processing hotline system, is illustrated by the many complaints and requests for the investigation made by the Olympic medalist gymnast, Simone Biles, and other gymnasts, who repeatedly demanded a thorough, independent investigation into the multiple complaints about sexual assaults and abuse committed by the U.S. gymnastics team doctor Larry Nassar. For many years, numerous complaints by young gymnasts and their families (often submitted anonymously) were not properly analyzed and processed, and were not elevated and transmitted to proper authorities for investigation. Instead, each complaint was processed and acted upon in an ad-hoc, non-systematic way, never cross-referenced with other complaints, and not processed and analyzed seriously and objectively. See Huffington Post article at https://www.huffpost.com/entry/simone-biles-usa-gymnastics-sexual-abuse-accountability_n_602a0788c5b680717ee8fa61.

Another example of the prevalent problems in the craft beer industry is described in the article "Tidal Wave of Sexual Harassment Allegations and Toxicity in Craft Beer Industry Lead to Terminations" (https://www.brewbound.com/news/tidal-wave-of-sexual-harassment-allegations-and-toxicity-in-craft-beer-industry-lead-to-terminations). This article indicates that a significant number of complaints were made about a particular industry, including allegations of pregnancy discrimination, sexual assault and other problems. However, because the breweries were very slow to respond and take appropriate action, the industry suffered significant bad publicity and terminations. This further illustrates the need for a quick and responsive system that allows different companies to share and use information that may be anonymously provided by employees of other companies or that reflect on the industry as a whole.

In addition to the problems involving learning institutions, teams, and governmental agencies, many private companies have instituted online and remote hotlines where employees can voice their opinions, provide suggestions, and launch anonymous complaints. The Harvard Business Review found that "when employees can voice their concerns freely, organizations see increased retention and stronger performance." Other studies have shown a clear correlation between an employee's ability to freely voice his/her views and the amount of employee engagement in company activities and business initiatives. Greater employee engagement translates to greater organization productivity and greater retention, which is of significant value to employers.

Unfortunately, currently utilized hotline and whistleblower complaint mechanisms have significant limitations and faults. To list just a few: (1) there is lack of independent processing that protects those who commence complaints; (2) the concept of anonymous complaints also is without proper safeguards and mechanisms to make such complaints affective; (3) there is a lack of whistleblower hotlines that are implemented as a SaaS/online system that offer complete anonymity to complainants; (4) there is a lack of systems that employ software code, including AI-calculations, to provide reliability and validity analyses of complaints; and (5) present systems don't utilize any type of snagging source codes for anonymous crowdsourcing. While crowdsourcing platforms exist, none serve to completely protect the anonymity of employees, and at the same time to use AI or automated computer software that causes the system to grab the source code to contact and promulgate the future work of the company with proper consultants in the relevant tagged area or topic.

OBJECTS AND SUMMARY OF THE INVENTION

Among other unmet needs, the above-summarized examples demonstrate the need for an independent system, that is, independent from the organization, along with automated, software and rule-driven hotline systems that properly receive, evaluate and process complaints, including anonymous complaints, from students, young (and not-so-young) athletes, families, company employees, customers and consumers, and that also protect complainants from harassment, intimidation, bullying, intentional indifference, reprisals and other acts of retaliation.

The major criticism of currently known systems, policies and procedures in place is that they usually protect the institutions that they serve, rather than serve the best interests of individuals. Maddie Slamone, the chairman of the NCAA's Student-Athlete advisory Committee from 2013-2014, told the Washington Post that "[e]verybody that an athlete could trust or may rightfully trust, they still work for the university and answer to the university. It creates complications and conflicts of interest because their ultimate goal is not to take care of athletes but to protect the department and avoid scandal." (2019 article—https://www-.washingtonpost.com/sports/2019/08/30/complaints-against-nebraska-softball-coach-show-college-athletes-limited-options/)

In view of the foregoing, a main objective of the present invention includes providing an automated system that allows athletes and students to anonymously report certain abusive practices, launch complaints, demand investigations, and prevent further abuse, all without fear of retaliation by the institution.

Further objectives include providing an automated reporting system that promotes equality and inclusivity, also without fear of retaliation by the organization or by individuals within the organization. Yet other objectives include providing proactive automated tools that ensure the diversity, equality, and inclusion of all voices, irrespective of whether or not complaints are launched anonymously.

As will be appreciated from the description herein, the present invention may be employed as an independent 24/7 hotline that provides an anonymous feedback loop (like crowdsourcing) and to replace current whistleblower hotlines as an automated and rule-driven system, with specific implementation of the intended protection of the callers and appropriate customization for the specific companies, industries, variations in state laws and regulations and other variations of local and state-specific nature (e.g., taking into account the varied reporting requirements of different states).

Other goals and features of the present invention include providing systems that allow company employees to provide their own evaluations, offer suggestions, comments or launch specific and/or anonymous complaints against company management or the company's overall policy.

Yet still further objectives include providing platforms that entail greater reliability of assessing and reporting anonymous complaints that, in turn, are assessed, processed, reported and acted upon by associated relevant organizations, management and governmental entities.

Additional objectives of the present invention include systems that achieve/implement one or more of the following: (1) serve to anonymously crowd source innovative ideas and, when applied, increase workplace productivity; (2) demonstrate and improve leadership or management commitment to diversity, equality, and inclusion in the workplace; (3) ensure that the organization leadership and management hear all voices equally and fairly, not just those with better access or are more dominant in inter-organizational discussions; (4) diminish the "gossip at the water cooler" with a direct avenue to the source; (5) cultivate and improve the environment that does not tolerate harassment, intimidation and bullying in the workplace; (6) unleash the hidden potential, engagement and idea-generation function of the company staff, employees or customers; (7) provide automated reporting mechanisms that promote equality, diversity and inclusivity without any fear of negative response or retaliation; (8) provide an anonymous reporting processing, with higher level of reliability; and (9) provide a software-as-a-service (SAAS) implementation of an automated and comprehensive system, with a simplified user interface, AI and software-based processing, reporting and storage of private and sensitive information.

The above-mentioned objectives, features, and aspects of the present invention are illustrative and non-limiting. In summary, the following embodiments, and features and aspects thereof, represents various systems and processes of the present invention (stated in more technical terms).

In accordance with the present invention, a method for automatically processing online complaints comprises receiving and processing registration information about an entity; creating and providing a unique coding entry for the identification of the registered entity; generating and populating a key word database associated with the registered entity; receiving an input data from a user, comprising an idea, a complaint with identification information or an anonymous complaint; searching the key word database in any communications involving the registered entity; automatically analyzing the received user input data and determining whether the input data comprises a complaint launched or reported by the user; preforming a zone of reliability verification analysis on the received data; automatically scrubbing and removing private personal information (PPI) from the received input data, and storing it in two datasets, the first dataset including the PPI and the second dataset storing data after scrubbing, with all PPI information removed; unsealing and providing access to the dataset with PPI information only upon receipt and verification of an unsealing decision or order; and automatically generating and transmitting one or more reports to governmental entities, industry groups or independent organizations, based on the analysis of one or more reported complaints and at least one guideline provided by federal laws, state laws, local regulation, industry standards or entity-specific policy.

As an aspect of the invention, the unique coding entry, created and provided for the identification of the registered entity, includes a three-standard-words combination and further utilizing the three-standard-words combination for identification of the entity during registration, receiving and processing communications from the user and reporting.

As a further aspect of the invention, the method further comprises calculating a rating score to the registered entity as part of the engagement data; and creating and transmitting periodic engagement emails that include registered entity rating score and industry rating information, or any changes in the rating information.

As another aspect of the invention, the method further comprises creating and maintaining a second industry key word database, and including the keywords in a key word database for the registered entity into the second industry key word database; performing analysis and reporting of the overall industry, without identifying the specific or personal registered entity in the report; and transmitting the generated reports to one or more governmental entities, industry groups or independent organizations involved with the industry.

As an addition aspect of the invention, the receiving and processing registration information about an entity includes receiving and procession information that designates at least one person as a point-of-contact for the registered entity, and assigning weight qualification to the idea entered by the user at least partially based on a number of other users that present a similar idea.

As yet another aspect of the invention, the process further comprises providing multiple pricing options for different offered services, and receiving and processing registration information that reflects at least on selected pricing option and at least one selection of the offered services for the registered entity.

As yet a further aspect of the invention, the key word database associated with the registered entity comprises special goals and objectives that the entity wants to improve, or one or more specific problems or challenges that the entity wants to address.

As still yet another aspect of the invention, the zone of reliability verification analysis of the received complaint data comprises confirming the location of the user, who provides complaint data, based on an IP address or zip code provided by the user.

As still yet an additional aspect of the invention, the method further comprises encrypting dataset with PPI using one or more encryption key; and linking the dataset with PPI with the corresponding dataset where all PPI is removed.

As a further aspect of the invention, the method further comprises automatically executing a data collection protocol, comprising sending a Webpage with an entry space or a form to enter a date of the incident, a text box for data entry, an option to upload images or an option to activate a webcam to take and include an image of the user; and receiving and processing data collected from the user as part of the data collection protocol.

In accordance with a further system embodiment of the invention, an automated system for processing online complaints comprises at least one processor executing computer instructions stored in a tangible, non-transitory computer readable storage medium causing the processor to: receive and process registration information about an entity; create and provide a unique coding entry for the identification of the registered entity; generate and populate a key word database associated with the registered entity; receive an input data from a user, comprising an idea, a complaint with identification information or an anonymous complaint; search the key word database in any communications involving the registered entity; automatically analyze the received user input data and determining whether the input data comprises a complaint launched or reported by the user; preform a zone of reliability verification analysis on the received data; automatically scrub and remove private personal information (PPI) from the received input data, and store it in two datasets, the first dataset including the PPI and the second dataset storing data after scrubbing, with all PPI information removed; unseal and provide access to the dataset with PPI information only upon receipt and verification of an unsealing decision or order; and automatically generate and transmit one or more reports to governmental entities, industry groups or independent organizations, based on the analysis of one or more reported complaints and at least one guideline provided by federal laws, state laws, local regulation, industry standards or entity-specific policy.

As an aspect of this embodiment, the unique coding entry, created and provided for the identification of the registered entity, includes a three-standard-words combination and further executing computer instructions that cause the system to utilize the three-standard-words combination for identification of the entity during registration, for receiving and processing communications from the user and for reporting.

As a further aspect, the processor executes computer instructions that cause the system to: calculate a rating score to the registered entity as part of the engagement data; and create and transmit periodic engagement emails that include registered entity rating score and industry rating information, or any changes in the rating information.

As another aspect, the processor executes computer instructions that cause the system to: create and maintaining a second industry key word database, and including the keywords in a key word database for the registered entity into the second industry key word database; perform analysis and generate report on the overall industry, without identifying the specific or personal registered entity in the report; and transmit generated reports to one or more governmental entities, industry groups or independent organizations involved with the industry.

As an additional aspect, the processor executes computer instructions that cause the system to: receive and process information that designates at least one person as a point-of-contact for the registered entity, and assign weight qualification to the idea entered by the user at least partially based on a number of other users that present a similar idea.

As yet another aspect, the processor executes computer instructions that cause the system to: provide multiple pricing options for different offered services; and receive and process registration information that reflects at least one selected pricing option and at least one selection of the offered services for the registered entity.

As yet a further aspect, the key word database associated with the registered entity comprises special goals and objectives that the entity wants to improve, or one or more specific problems or challenges that the entity wants to address.

As still yet another aspect, the zone of reliability verification analysis of the received complaint data comprises confirming the location of the user, who provides complaint data, based on an IP address or zip code provided by the user.

As still yet a further aspect, the processor executes computer instructions that cause the system to: encrypt dataset with PPI using one or more encryption key; and link the dataset with PPI with the dataset where all PPI is removed.

As another aspect, the processor executes computer instructions that cause the system to: automatically execute a data collection protocol that sends a Webpage with an entry space or a form to enter a date of the incident, a text box for data entry, an option to upload images or an option to activate a webcam to take and include an image of the user; and receive and process data collected from the user as part of the data collection protocol.

In accordance with a further embodiment of the invention, a method for automatically processing online complaints, comprising: submitting registration information about an entity; utilizing a unique coding entry for the identification of the registered entity; providing or receiving one or more key words for storage in a database associated with the registered entity; receiving a selection request to enter an idea, launch a complaint with identification information or launch an anonymous complaint; transmitting information that designates at least one person as a point-of-contact for the registered entity; transmitting input data from a user, comprising user selection for enter the idea, launch the complaint with identification information or launch the anonymous complaint; providing data for a zone of reliability verification analysis on the user-transmitted data; providing verification of an unsealing decision or order, and instructions for unsealing and providing access to a dataset with PPI information; receiving notification of one or more automatically reports to governmental entities, industry groups or independent organizations; and receiving a rating score to the registered entity as part of the engagement data.

As an aspect of this embodiment, the method further comprises receiving multiple pricing options for different offered services; transmitting the selected pricing option and at least one selection of the offered services for the registered entity; and receiving periodic engagement emails that include registered entity rating score and industry rating information, or any changes in the rating information.

Various other objects, advantages and features of the present invention will become readily apparent to those of ordinary skill in the art from the following detailed description of the invention.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 5 schematically illustrates some of the advantages of the present invention in comparison to currently known and used systems.

DETAILED DESCRIPTION OF THE PRESENT INVENTION

Definitions

Figure 1:
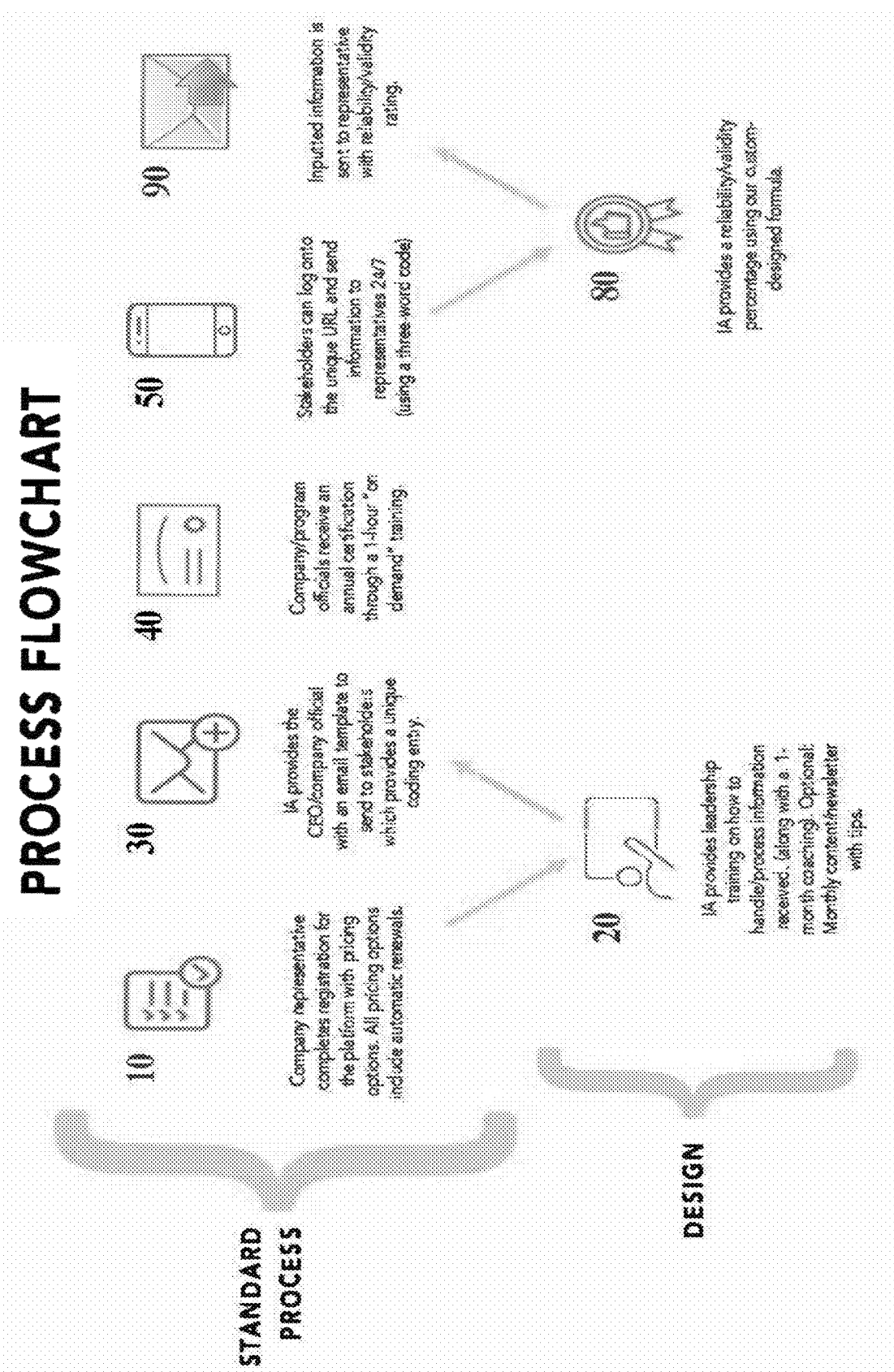
FIG. 1 schematically illustrates the process flow in accordance with certain embodiments of the present invention.

In the discussion herein, the following definitions of various terms are provided for various purposes, including establishing broad definitions of such terms and for other reasons as set forth below.

The terms "customer," "customers," "user," "users," "caller" and "callers," are used interchangeably herein.

The terms "transmission," "communication," "transfer," and the like are intended to include direct or indirect communication, and wired or wireless communication, and may be achieved via any known manner known. Unless otherwise stated, communication between devices include wired or wireless communication, include direct communication (e.g., Bluetooth communication) in certain embodiments and include indirect communication in other embodiments. Indirect communication includes communication between intermediary devices, computing systems, communication portals and other devices known in the art.

Input by a user of a computerized device is intended to be broadly construed and may include any action or a set of actions by the user that are perceived by a mechanical, electrical, optical, audio, or other device capable of receiving a human-provided output, such as a "click" on a mouse, depression of a button, a selection or depression of a key on a keyboard or keypad (including a virtual keyboard or keypad), a contact on a touch-screen type device, a voice command received by an appropriate computing device, and/or a physical gesture also received by an appropriate computer device (e.g., devices employing a camera or other types of sensors that detect movement), among other forms of input to such devices.

The types of devices that can receive and process the transmission, communication, or other form of input by a user includes, as non-limiting examples, a keyboard, touch-screen, mouse, input device of a computer, smart phone, tablet or other mobile electronic device, a remote control, key fob, camera system coupled to a suitable computing device, computing system that employs a microphone, movement/motion sensors, optical systems, and devices/systems that include a combination of any of the foregoing.

Output from a computing device and the like to a user is intended to be broadly construed and may include any action or a set of actions by the computing device (with or without the assistance of associated devices) perceivable by a user and includes, as non-limiting examples, information on a display or visual output on another device, audio output (e.g., from a speaker), tactile output (human-perceivable movement), and other known manners where a computing device is able to convey information to a human.

The terms "smart phone," "mobile phone," "mobile device," "computerized device," "computer," "computing device" and the like as used herein are used interchangeably herein and includes devices capable of being programmed and, as appropriate, have communication capability and/or are used to facilitate/carry out the functions, steps and/or processes described herein and include, as non-limiting examples, desktop computers, portable computers, laptops, smart phones, tablets, smart watches, and other appropriate technological devices.

As illustrated, the present invention is not limited to the use of a single operator, a single platform, a single type of device, etc. Hence, the present invention is applicable to any type of device capable of carrying out the various functions as described herein (within the relevant embodiment) and applicable to any operator.

Discussions pertaining to a computer, server, processor, electronic device, computing device, and the like shall include a combination of multiple devices. Language relating to a computer, computing device, electronic device, and the like includes any suitable combination of computing devices, including servers, systems, databases, controllers, engines, interfaces, or other types of devices generally recognized to be used within or associated with computing devices.

Computer, computing devices and electronic devices employ a processor (e.g., a CPU or controller) configured to execute software instructions that are stored on a tangible, non-transitory computer readable storage medium. Computers, computing devices and electronic devices, along with their associated processors and the tangible, non-transitory computer readable storage mediums are well known in the art. The present invention also is described as carrying out certain processes, steps and functions. Such processes, steps and functions are carried out by appropriate computers, computing devices, electronic devices, processors or other known components capable of carrying out those processes or steps. Hence, even if structural devices are not mentioned within each of the various sections presented herein, the foregoing mentioned structural devices, such as a processor, computer, computing system, electronic device, etc., represent the structures that may be used in the present invention.

The present invention is described as a multitude of processes in terms of functions, steps, objectives, and other things, and given the discussion herein, and in light of the discussion herein, a person of ordinary skill in the art to which the present invention applies is able to generate the corresponding code, software applications and "apps." Custom apps may be developed to facilitate these functions wherein a user is simply able to push a virtual button on his/her smart phone (or other device) and then the app does the rest, with the assistance of remote servers/systems as discussed herein.

The server or processors may employ artificial intelligence (AI) software to perform various analytics processes.

Since technology for enabling communication between devices, whether direct or indirect, and whether via the Internet or other methodology are well known in the art, detailed descriptions of such technologies and methodologies are not provided herein in order to avoid obscuring the inventive subject matter described herein.

Process Flow

An example of the overall process flow in accordance with certain embodiments of the present invention is described with reference to FIG. 1. Initially, in Step 10, a company, hospital, team, educational institution, or any private company registers for "It's Anonymous" (hereinafter "IA") services and designates (hereinafter "CD") at least one person as the point-person for the platform. Generically, IA includes the systems and personnel behind the services provided.

Figure 2:
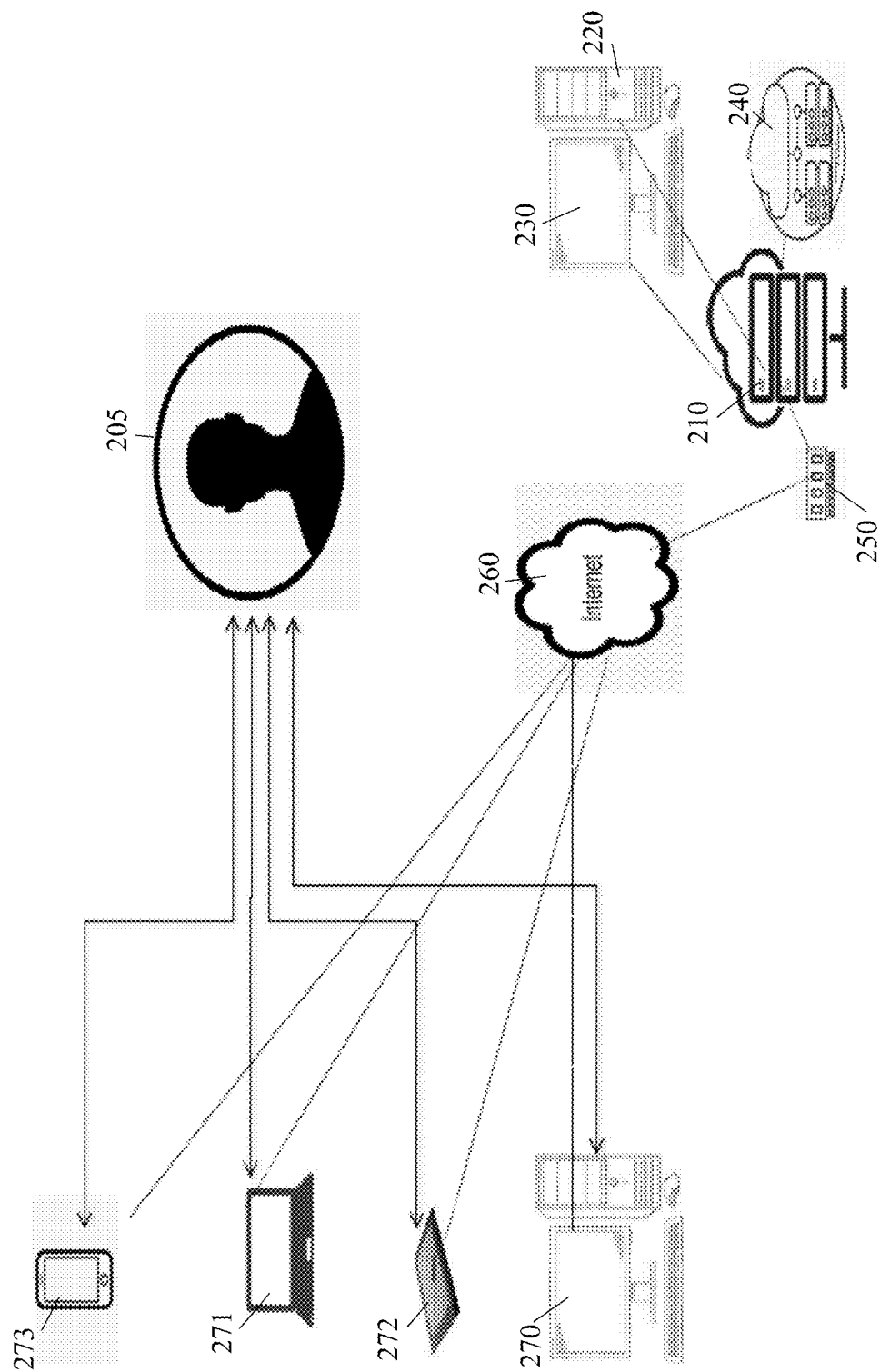
FIG. 2 schematically illustrates interaction and interfacing between the user and the software operating on the IA server in accordance with the present invention.

Before continuing with the process discussion shown in FIG. 1, FIG. 2 is referenced to schematically illustrate the interaction and interfacing between user and the software operating on the IA server in accordance with the present invention. In FIG. 2, the IA may be a server 210 that includes one or more computer processors, microprocessors or CPUs 220, a display screen 230, a computer memory 240 (for example, RAM, ROM or PROM memory) storing computer instructions, which are executed by the processor to perform the described functions of the IA that are described in this application. The server 210 is enabled with a communication interface and an Internet connection 250 (for example, T1 line or Wifi modem) that allows the server to connect to and communicate over the Internet 260 or to another type of network through which an individual (user) can connect and transmit data. The user can communicate using a desktop computer 270, a laptop 271, a tablet 272, a mobile device (for example, a mobile phone) 273 or any other device that can connect to Internet and transmit and receive HTML, XML or other communications that are used for data transmission. Alternatively, the connection and data transfer can be performed though a LAN or WAN, or any other type of closed or open network. Other manners of known technology and communication protocols not otherwise described herein, may be employed, as appropriate.

Referring back to FIG. 1, in step 10, the company representative or the athletic program official (or other designated person) contacts the independent IA service provider and completes the company registration process, which includes pricing options along with a selection of various services that can be provided. As part of the engagement, the company may sign an agreement with IA for use and access to the IA server along with additional information and training that are provided to company management.

In step 20, IA provides custom-tailored training for leadership in how to process/handle information, such as how to deal with negative information, dealing with data and situations that are not intuitive, how to respond and what information is considered valid. Optionally, IA provides a limited-time of free training/coaching, monthly newsletters, and other related information.

In step 30, IA provides the CD with a uniquely or specifically designed email template announcing the partnership and commitment to diversity, equity, and inclusion, along with ensuring that all voices are heard throughout the organization/program. In at least one embodiment, the stakeholders are provided a unique coding entry (e.g., comprising of three standard words) that are typed into the URL for anonymous coach. The unique coding entry is used for unique identification of the organization represented by CD or any particular department within an organization. In at least one embodiment, a unique coding entry may be used to identify a company branch or a department (or any group) within the organization, or an independent organization of multiple companies.

Keyword Bank

The IA server may also generate and populate the keyword database or "word bank" associated with the company's initiative. The word bank may include key terms that may be automatically searched for by the AI in any communications involving the company, the specific goals and objectives that the company wants to improve, and/or the specific problems or challenges that the company wants to address.

The key word bank that is organized for or provided by the specific company may be added to the overall "industry word bank". For example, the company that provides a laundry service may include its own specific key words "lost clothes" or "wrinkled", and these key words are added to the overall industry word bank that analyzes problems and data for all laundry-related services. The IA may perform analytics on the overall industry, without utilizing specific or private information, and generate reports that concern or impact the whole industry (e.g., Diversity Engagement Initiatives (DEI), mismanagement, etc.) In addition to many reports and information that IA may provide to the individual companies about the common trends, challenges and problems in the industry, the IA may also provide the identified areas of concern or action in the annual or periodic reports to SEC and other governmental agencies, industry groups and independent organizations.

Automated Reports and Notifications

Among the above reports, or in addition to them, the IA may also generate and send weekly emails, which can provide further details of the analysis (e.g., for trends, patterns) of the replies to weekly emails. Such details can also provide the identified trends and an analysis of how the identified trends & patterns are converted into useful data and projections for the future.

The invention may generate engagement emails in certain embodiments. For instance, the IA server automatically generates and send all members of the lacrosse program (at a partner college) an email on a given day (e.g., Friday) asking how they (and/or the college) are doing? It could be implemented as a simple 1-10 scan with some face emojis. After a click, the user is brought to the landing page on the IA server, where the user may report an idea or other information, such as complaints, etc. The engagement data is processed, analyzed, scrubbed of private personal information (PPI), particularly when anonymity is desired, and holistically sent to the partner institution. It includes metrics of how things are going. For example, it may report that the hospital patients are satisfied with the care received (for example with n=175 participates with an average score of 7/10 on their satisfaction of care), or employees are satisfied with the company (n=15 with an average score of 8/10 for the month of December). Users can also compare previous reporting statistics as well.

Automated Engagement Metrics

As part of the engagement analysis, the data can be utilized to demonstrate employee engagement, provide metrics to the partner, inform potential consultants/work, and to get users familiar with the reporting features/mechanisms.

In step 40 in FIG. 1, the participating organization's employees and officials receive an annual certification through a one-hour (or other fixed period) "on demand" training video that is specifically designed to work in concert with the platform and promotes the stronger decisions and maximizes employee engagement through anonymity and inclusivity. The company management also may be coached through more individualized in-person sessions or virtual classes by IA or third parties that are automatically identified and selected for this by the software executing on IA server, based on the company's materials provided in steps 10 to 30.

In at least one embodiment, IA utilizes AI or other computer program(s) to create a customized letter/email or an outgoing message to the company's employees, which may indicate the company's commitment to DEI (diversity, engagement, inclusion), set the desired goals and objectives and ask for the employees' comments, suggestions, evaluations, etc.

The AI may extract a specific word or keyword, phrase or a combination from the user input, word bank for the company or a global word bank (e.g., a database or files of key works) for the whole industry, and insert or generate the specific text into a standard template/letter based on the extracted specific word or keywords. It can also use the data entered by one or more callers or users, as discussed in the Engagement Analysis section below.

Three-Standard-Word Combination

In step 50, when the stakeholders (e.g., students, athletes, employees) input the unique coding words for the company, organization or department (e.g., a three-standard-word combination) into the general landing page on the "It's Anonymous" (AI) homepage, they are directed to a new URL that is specific to that company, organization or department. In step 60, the connected users have the option to select from a variety of reporting features that are preferably available 24/7, with no limit (or some large limit) to the amount or number of entries.

In at least one embodiment, the employees of the company (all or some selected) take a one-hour (or other duration) training course. Upon completion of training of all or most employees, the employees and/or the company may be issued a certificate of completion by IA, which can be automatically generated and sent by the IA server to the provided emails or other contact information.

Privacy and Anonymity

In Step 70 (not shown in FIG. 1), using the computer software that may be implemented as a self-teaching and learning artificial intelligence (AI), the server and the system processes the information provided by the individuals, removes the IP addresses from the data and metadata, and automatically identifies certain key words using the pre-stored lists or database with specific key words. The key words and database may be updated by the AI and the system as more important key words, or words referring to a specific situation (or common situations) are identified.

Reliability Analysis

During the onboarding process, the company [CD] provides IA with zip codes and locations of all employees. This information is cross-referenced by the AI to determine a level of reliability validity. A specific distance or a geographic distance around the employee's location can be generated. This distance can further be utilized by the computer program to automatically block as potential spam or give lesser reliability ratings to the user's IP address that is further away from the registered user's location.

Zone of Reliability/Validity Rating

In addition, as part of the company's "onboarding" process with IA, the company, company employees' names, zip codes, known addresses can be entered into the database accessed by IA server. In at least one embodiment, a layer of circumferences are established around the inputted data from a user, such as for example the area around the user's address. This area may establish a geographic zone of reliability/validity for the future communications from the user with IA, and for launching anonymous complaints.

In step 80, the inputted information (received from the user) is processed by the IA and the software calculates the reliability/validity percentage for the user's communication using the formula and relationships that are based on the company information, goals, concerns and other data. An example of the reliability/validity percentage calculation is described further in this specification.

The reliability/validity rating is sent to the CD from IA in step 90. Preferably, the system and connection is designed with a strong data integrity and security features, such as, for example, encryption of password and/or userid, double id confirmation functionality, and other security features. Multiple security features are embedded into the system to prevent any access of either the sealed (secure and private personal information or PPI of the individual) or the aggregated data all PPI identification removed. The description of the sealed data and aggregate data (with PPI removed) is described in more details below.

Revenue Allocations

In addition to other benefits, the IA server may also process and automatically allocate some percentage (e.g., 3 percent) of its revenue back to the victims. As a result, IA is utilizing the system that empowers the victims and gives them a voice. Another benefit of the present invention is that the IA provides consultants and/or arbitrators based on the automated source coded AI or software-drive analysis. This allows the organizations and companies to engage the best-suited consultants and expert in a particular area of concern that is automatically flagged and reported to the company. The consultant recommendations may also be automatically included as part of the results and recommendations to the company or organization.

The specific features and other aspects of the present system are further described and illustrated below with reference to specific examples.

Example 1—Processing of Student Complaint

A student receives an email on a Friday, during a particular month. Similar emails are also sent in prior weeks, from the date that the University where the student is studying has partnered with IA. The email may ask the student to rate how the University Soccer Team is doing. The email may include a link to the IA server webpage, where the student may be asked to rate the Soccer Team on a 10-point scale.

The student then selects a score of 2 on the 10-point scale and possibly the associated appropriate emojis. Upon submission, the processor on the server cross-references and checks the student's prior provided grades. In this case, it may determine that the same student has previously given a much higher grade (e.g., 7 on the 10-point scale) to the same team. This then opens up a specific IA landing page (on the IA server) for the student to consider launching a complaint and/or provide an explanation for why the grade was given.

In one example, the student makes the decision (unlike prior weeks), to report an incident of harassment by her/his coach. The student clicks the exemplary option "I want to file a complaint anonymously." The system then automatically executes the data collection protocol (according to the programmed steps) and sends to the student a Web page with an entry space and possibly specific questions or a form to enter the date of the incident, a text box for data entry, an option to upload photos/pictures, and an option to activate her/his webcam to take a photo. The student then completes the form and clicks "submit."

In addition, in some embodiments, when the student is connected to the IA server, it may allow the student to turn on the camera and/or microphone and enables the person to tell the story into his or her mobile device or a computer. The video and/or audio file is then transmitted to the IA server, where it is analyzed, processed, and stored by the computer software.

The server then evaluates the received information and sends to the student (and the student receives) additional links and resources, with a statement that reassures her/him that the complaint has been filed anonymously, with strict data integrity, and that it will be addressed with the university officials in a timely fashion.

Data Scrubbing and Securing Privacy

Figure 4:
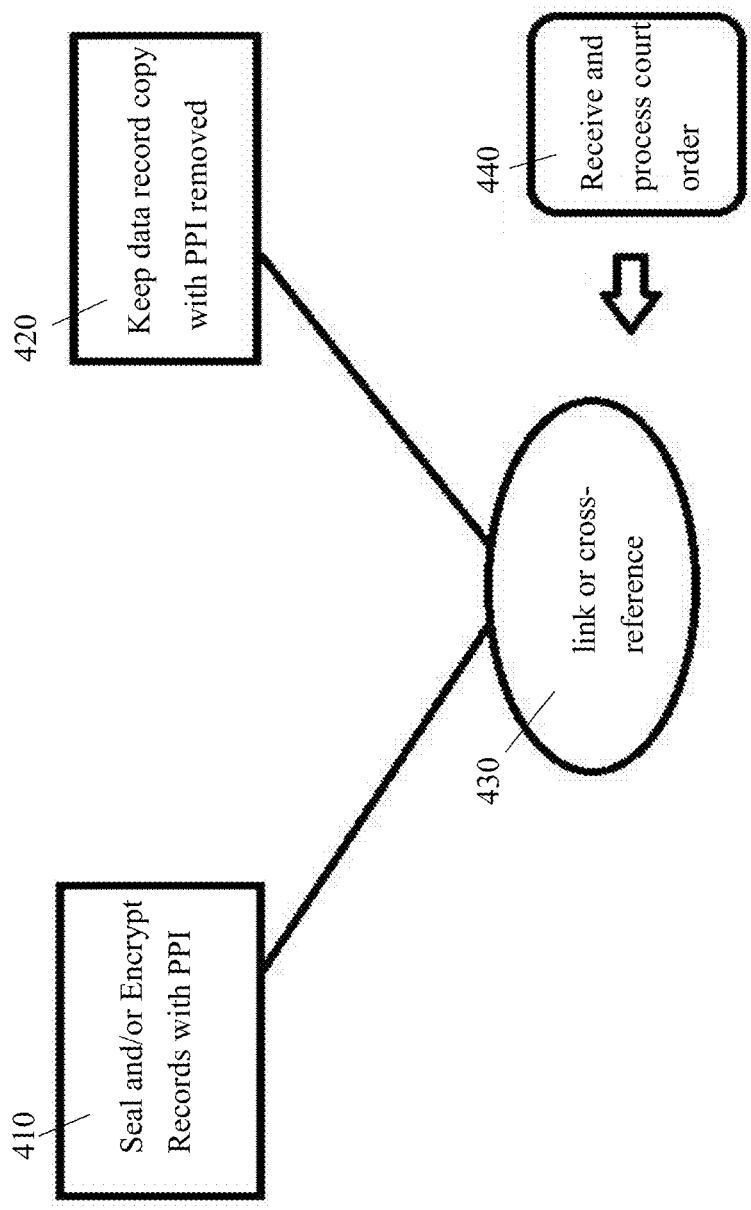
FIG. 4 schematically illustrates the organization and encryption of data records with personal data and anonymous reporting options in accordance with the present invention.

FIG. 4 schematically illustrates the organization and encryption of the data records with personal data and anonymous reporting options. Referring to FIG. 4, IA then executes specific computer instructions that seal the record 410. For example, the actual data 410 is encoded with an encryption key and can be decrypted (or unsealed) only by a court order 440, or specific instructions from the police or other judicial or investigatory body. The order or instructions may be further evaluated by the company management and/or automatically acted-upon by the computerized system that maintains and secures data records and communications.

In addition, a duplicate "public" copy 420 of the record may be formed and stored by the IA server. The software program executes on the IA server and scrubs the student's IP address and other private and personal information ("PPI"). The actual sealed record 410 and the "public" copy (with PPI removed) can be linked together or cross-referenced by the IA 430, connected via pointers or interrelated through any known programming techniques. The details of the incident, however, are sent as an email or a message to the designated contact from the university. For example, in one embodiment, the public (i.e., anonymous copy) may be sent to the athletic director who received a certification on how to process the complaint information/data.

In addition, the IA server may send an additional notification to the university regarding the incident, with a list of recommendations, reminder of the training video (with a link), and consulting/arbitration options. The IA may use some of the data it has processed from the entry as part of the regular reporting process.

Potential Outcomes

The athletic director (or other designated individual) and university receive a generated report and suggestions from IA and/or related consultants who may be connected by IA to provide their analysis and recommendations. Then the university implements steps to remedy the situation and the outcome yields (in this particular case) a suspension, required training, and verbal reprimand to the soccer coach. The coach completes her/his training and reflects on his/her practices realizing that his/her behavior may be unintendedly causing difficulties and problems to the soccer team or some of its member. The coach corrects her/his behavior and continues to have an incredible career.

In another possible outcome, the software operating on IA server cross references other complaints and determines that the same coach was also reported by three other students during the month of May. The athletic director and university receive a generated report and suggestions from IA and/or related consultants who may be connected by IA to provide their analysis and recommendations. This time the provided recommendation (which is acted upon by the athletic director and university) is to terminate the coach for egregious behavior and avoid additional harm/abuse towards other athletes. IA may also have specific rules and an automated process that will report the coach to the ethics commission and provides specific consultants that will guide the University through the entire process.

In yet another possible outcome, the athletic director and university decide not to take action and ignore the complaint and IA report and recommendations. The university, despite its training and partnership with IA, decides that the complaint lacks validity in an anonymous tool (or that the anonymous complaint is contradictory or has other questionable consistency or trustworthiness issues). The coach continues to sexually harass (or bully) the players. This time a student logs into the IA system and uses her/his name. The family bring an action against the school.

Unsealing Process

During the proceedings a court orders that the records of the incident and the complaint (which are sealed by the IA server) should be unsealed. Then the IA server executes computer instructions that will decrypt the stored (sealed) records associated with the anonymous complaint by the student.

As part of the unsealing process, the system may execute computer instructions to evaluate (using, for example, the key event description) whether the sealed anonymous data in the original filing (completed anonymously) matches the facts and data in the complaint that is filed with the student's name in court or other judicial or executive agency. If the system determines that the original anonymous complaint matches the data in the non-anonymous court-filed complaint, the coach is terminated, and the school is exposed for ignoring the complaint.

Issuing Recommendations

In yet another example of possible outcome, the athletic director and university, upon receiving the evaluation and recommendation from the IA automated system and/or related consultants, investigates the situation thoroughly and determines that the complaint lacks credibility and may have been intended to cause harm to the coach (for example, the complainant doesn't like her/him due a playing time reduction or other reason). The IA system has put the coach on notice and shed light that the university is taking all matters and incidents seriously. The volleyball coach, for example, learns about the situation and reflects on his/her practices and recommends that the university push out a new program to ensure student safety.

User Interface With IA and Reliability/Validity Calculation Examples

An example of the user's (for example, employee's, student's, or athlete's) interaction and interfacing with the software operating on the IA server is provided below. An employee 205 (FIG. 2) may connect his or her computer device (e.g., 270, 271, 272, 273) to the server 210 through the Internet 260, or "log into" the IA server on a computer network. The user is connected to a specific landing page, either through a link sent in an email or message sent to the user device 270-273. The connection may be established though the Internet or any type of network (i.e., a LAN, WAN, etc.).

In at least one embodiment, the user 205 is asked to turn off the VPN/ghost IPs on its mobile device in order to allow the server 210 (in FIG. 2) to communicate with the user device 270-273, and more specifically to be able to perform the validation processing.

The server 210 validates the user's interaction by receiving and processing the IP address of the user's device 270-273 and matching it with the zip code or an address that is used. The percentage of the reliability/validity of the communication and any complaint that may be launched by the user is based at least partially on whether the IP address of the user's device matches the zip code of the user (or that is associated with the user) or the company.

Three-Word-Combination Unique Code

The user also enters the three-word unique code words associated with the company, and the system uses the three-word code words to find and recognize the company for which the user intends to provide his or her response or information. For example, one company may use a three-word combination A (e.g., blue, toilet, soccer), which is entered by the user in order to provide user comments and other data for a specific company or organization. The IA server distinguishes the three-word combination A from a combination B (e.g., brush, popsicle), the latter which is used for another company or organization.

The three-word combination is processed by the computer software, executing on the IA server to connect the user to the correct webpage, which is used only for the company or organization in which the user is a member, employee, student, etc. The users are also provided with visual display information, identifying the company, and can double check the access to the correct entity. In another embodiment, the users (like all team players or all employees) are given a specific company code, or an additional unique identifier, which can further supplement the process of reliability/validation of the user's input.

Figure 3:
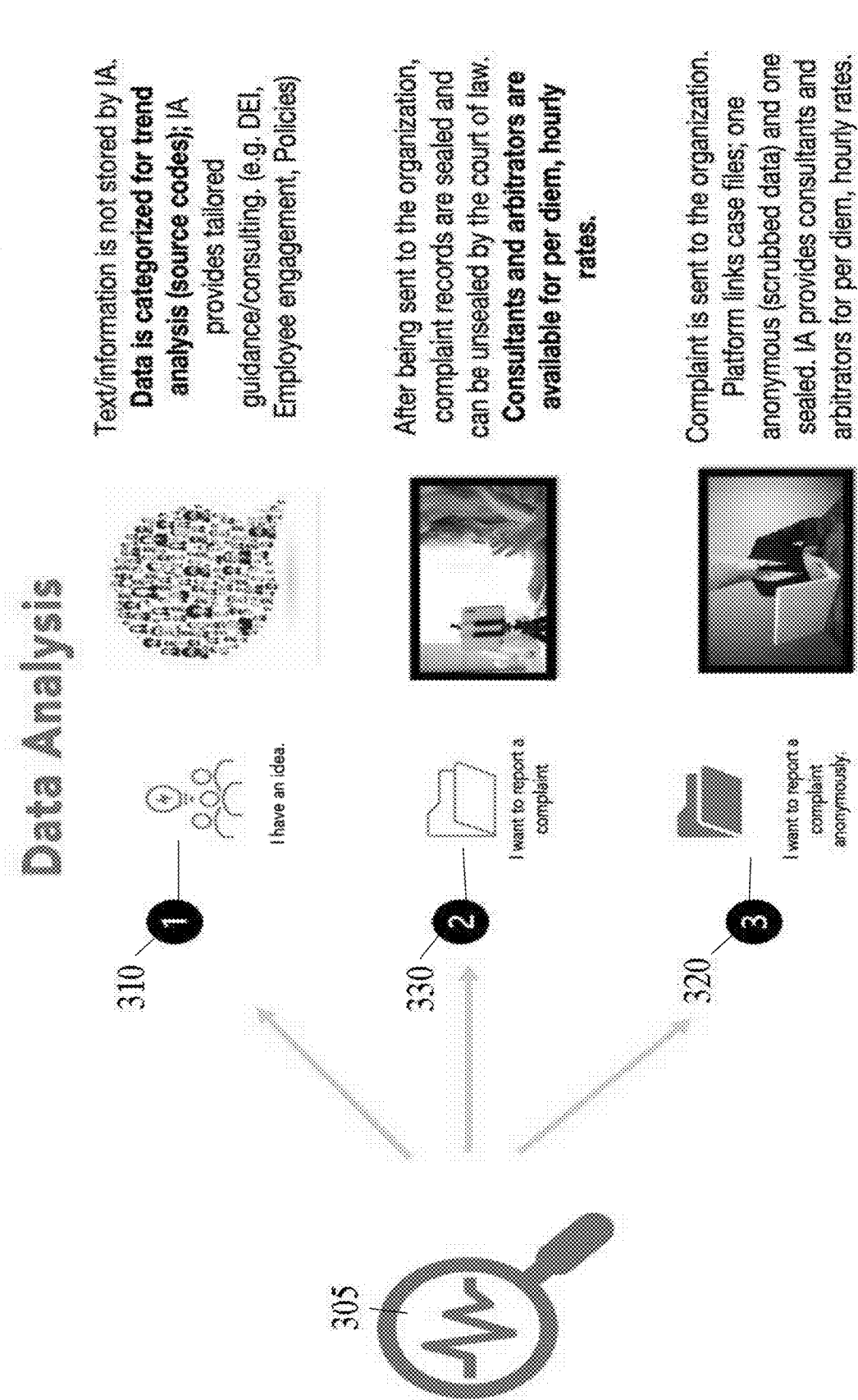
FIG. 3 schematically illustrates the process flow for communicating ideas, reporting or launching formal complaints, or reporting complaints of another person with verification, and reporting or launching anonymous complaints in accordance with the present invention.

FIG. 3 schematically illustrates the data analysis and process flow for communicating an idea, reporting or launching a formal complaint or reporting a complaint of another person with verification, and reporting or launching an anonymous complaint.

Referring to FIG. 3, once a user is connected to the web page that is used by the IA server for the company or organization at issue, the user 305 may be presented with several options. For example, option 310 may be "I have an idea"; option 320 may be "I want to report or launch a complaint"; and option 330 may be "I want to report a complaint anonymously."

Option 1—Sharing an Idea (An Anonymous Crowdsourcing Platform w/AI)

Option 310 may involve having the user enter the user idea as input on the user device, such as a mobile phone or a computer, using any input interface, such as a keyboard or a touch screen. The entered data is sent to the IA server through the Interface or any other network and gets processed and analyzed by the AI or software executing on the IA server.

In at least one embodiment, the AI or software executing on the IA server analyzes the user input and qualifies it based on a number of key words stored in the key word bank. The actual storage can involve any computer memory, file, database, and internal or external data storage system or device. In one example, the IA server performs the comparison of the user input data to various key words utilized for the company or organization, or the global key word bank (for the whole industry or similar types of organizations). It may assign different weights to different keywords, and/or determine the classification of the idea based on the combination of key word matches and/or a number of matches.

The weights and the qualification of the presented idea can be also adjusted based on a number of other users that present the same or similar ideas. For example, if multiple users present ideas for encouragement of greater diversity, the overall calculated value given to the presented idea by the IA server can be higher.

In at least one embodiment, the actual text may not be saved on the IA server, or may be encrypted after the analysis, to assure full confidentiality and protection to the user. The decryption of the actual text may require a key or some identification from the actual user who submitted this idea. In at least one embodiment, the IA server may also send the inputted text, with its calculated valuation and analysis, to the company. In some embodiments, all PPI (personal private information) is removed from the inputted text. This could be an option that the user chooses by selecting "An anonymous submission" option while communicating with the IA server.

Engagement Analysis

In addition to the function of submitting the user's ideas, the IA server also performs and generates an Engagement Analysis. In at least one embodiment, the engagement analysis include calculating a number of key words that are related to the user entry, or number of similar key word matches or relationship to the global industry key words.

In calculating the engagement analysis, the processor on the IA server may perform analytics on the company objectives either alone or in combination with the analytics for the overall industry, with or without utilizing the specific or private information of the user. In at least one embodiment, the IA server performs metrics analysis for the company in a particular area, taking multiple ideas from the company's employees, and compares the company to other organizations in the same industry. It may also compare the company or the industry at issue to other industries, with respect to the specific topic that relates to the ideas provided by the company employees. The resulting customized analysis and report are sent to the company either weekly, monthly or on some periodic basis.

For example, the IA server may perform metrics comparison of the ACE Hardware Store in comparison to other hardware stores in certain geographic area, where the data is collectively aggregated for the analysis. The analysis may involve the comparison of the initiative, metrics, grading, goals, achievements, problems, and other criteria in the area of Diversity Engagement Initiatives (DEI), mismanagement, or another specific topic.

In another example, a particular hospital is compared to other hospitals and to the industry average for the specific topics that involve user input for that hospital. The report may also include additional topics and analysis in the report, for the areas where there are no user data or the hospital. For example, if no complaints about management and prices are launched for the specific hospital, it may receive a higher grade in comparison to others in the automated reports generated by the IA software, or AI.

In addition to many reports and information that IA may provide to the individual companies about the common trends, challenges and problems in the industry, the IA may also provide the identified areas of concern or action in the annual or periodic reports to SEC and other governmental agencies, industry groups and independent organizations.

In at least one embodiment, the IA server report may also include specific consultant or specialist recommendations. For example, when reporting on a DEI issue, the IA software will find the proper consultants in this area and the geographic location, and will include the contact information and recommendations to assist the company in training/professional development for DEI with the proposed consultants. In addition, the IA server may also generate an additional communication (such as an email or an automated call or text notification) that is sent directly to the consultants that are chosen by the IA software for a particular area of work or development for the company. The determination of the proper consultant recommendation may also automatically evaluate the financial ability and consultant rates, availability, and schedule in order to match the company with the proper consultant for the topic at issue.

The engagement analysis and automatic generation of customized reports may also involve the AI or software generating specific source codes that are dependent on the organization/company. Examples may include, but are not limited to, the following informational topics and evaluation of input ideas or comments on various topics, including:

Salaries/compensation
Travel and expense
Favoritism
DEI
Company Communication
Workplace conditions
Idea generation
Regulation/compliance
Talent acquisition The IA server processes the incoming ideas and may organize and tag them under a number of categories or topics (see above). In some embodiments, the tags and analysis categories may also involve such additional topics as: (a) new way to generate revenue; (b) improvement in workplace efficiency; and (c) process/procedural changes or suggestions. Many additional tags and topic areas are possible and contemplated.

During the evaluation of the user input and aggregation of multiple users in the process of engagement analysis, the IA server may use the AI or software that operates the processor to snag the source code (e.g. T&E) and track the percentage of entry source codes assigned to various user entries. For example, during the month of December, Getaway has 40% engagement in the area of work requirements/demands; 20% engagement on DEI; 20% on salaries and compensation; and 10% other. The AI or computer software causes the system to alert the consultant and/or leaders in that particular space and generates a report to be sent to the organization.

As part of the analysis, IA server may execute computer instructions that cause the system to point out (through the automated analysis and generated reports) that there is an increase in concerns related to DEI (Diversity Equity and Inclusion) steadily rising from 10% (in October), 45% (in November) and now 63% (in December). It may further recommend that the company management should contact a particular consultant chosen by the IA. The chosen consultant would assist the company with the ideas on how to further analyze the data and provide embedded professional development/learning. The consultant's name may be automatically determined by the IA software and the name and contact information inserted into the recommendations, reports, and communications to the company.

Currently available crowdsource platforms, unlike the present invention, do not provide a truly anonymous mechanism for providing information flow.

IA also uses AI or computer software to tag source codes and processes inputted data in a fashion that provides for the CD to identify prevailing trends of inputted information. Using anonymous data and information is not intuitive; in fact, the idea of anonymous information is often discouraged and not treated with value. IA provides a ubiquitous, anonymous feedback loop to provide employees an avenue to share ideas without fear of retaliation, retribution, mocking, and/or failure. There are no platforms or mechanisms where employers can hear "what needs to be said" or "what is not being said" in the room. This restricts the potential of the organization (cost savings/new revenue streams) and can also hide potential cases of discrimination (racism, agism, and sexism), harassment and intimidation in the workplace furthering the disparity of inequality. This avenue helps unleash the hidden potential of organizations and communities by giving a voice to the silenced, marginalized, and oppressed.

Some of the advantages in operation, organization and functionality of the present invention are discussed with reference to FIG. 5, which visually illustrates some of the advantages of the present invention in comparison to currently known and used systems.

The present invention utilizes an automated and comprehensive computerized system 510 and anonymous reporting platform that achieves a number of structural and functional benefits that are not present in the previously known and used systems, such as whistleblower hotlines 520, NYAS Report-a-Coach 530, U.S. Center for SAFESPORT 540 and OSHA reporting systems 550.

Unlike the known systems, the present invention implements and achieve a number of desired objectives to: (1) serve to anonymously crowd source innovative ideas and (when applied) increase workplace productivity; (2) demonstrate and improve leadership's or management's commitment 566 to diversity, equality, and inclusion in the workplace; (3) ensure that organization leadership and management hear all voices equally and fairly; not just those with better access or more dominant in inter-organizational discussions; (4) diminish the "gossip at the water cooler" with a direct avenue to the source (leadership); (5) cultivate and improve the healthy work environment 564 that does not tolerate harassment, intimidation and bullying in the workplace; (6) unleash the hidden potential, engagement and idea-generation function of the company staff, employees or customers, or providing a leadership system and tool for crowd sourcing important ideas and innovation 568; (7) provide automated reporting mechanisms 565, which promotes equality, diversity and inclusivity without any fear of negative response or retaliation; (8) provide an anonymous reporting processing 562, with higher level of reliability; and (9) provide a software-as-a-service (SAAS) implementation 569 of an automated and comprehensive system. The SAAS implementation may further utilize a simplified user interface, AI and software-based processing, reporting and storage of private and sensitive information.

Examples of the Option 1 Applications and Benefits

A CEO after a staff meeting asks all employees to log into IA to provide input into an initiative or to provide a generative flow of new ideas. IA identifies source codes and categorizes the information in a report format that allows the CEO to see patterns and trends in the inputted information. For example, a CEO can see that employees are struggling with a lack of resources allocated to T&E or an employee has an idea that will cut costs and save the company 25% of overhead. These ideas may not be shared in open groups for a variety of reasons (e.g., bureaucracy of the system, hierarchy of the organization chart, fear of failure, fear of not being taken seriously).

In another example, a few staff members are complaining about an office policy related to travel. While these dominant voices have the leader's ear, the leader is able to pull up the data from IA to demonstrate that the staff is indeed not concerned with said travel policy, but rather concerned with how a particular manager processes the information.

In yet another example, an employee has an idea on the weekend while visiting friends overseas. S/he/they log into the IA system and share a "gem of an idea" that will save the company millions. Additional examples may include (a) a hospital employee has an idea now the hospital can better serve its patients in the cancer ward, or (b) an employee wants to report another employee who is excessively misusing their T&E.

By processing and analyzing the "crowdsourcing ideas" from the employees, IA allows companies to retain top talent (by giving a voice to all staff), promotes diversity, equity, and inclusion, and helps identify systems, processes and services within the company that can be done more efficiently and effectively, as well as gauge possible redesigns and improvements.

Option 2—Reporting a Complaint (With ID)

Referring to FIG. 3, the use may select option 2 and launch a formal complaint with the company, or report a complaint of another person, this option requires the user to input data and provide his mobile phone number for contact and/or verification.

In at least one embodiment, the IA server sends a unique code/id/number to the mobile device of the user, and the user inputs the code on a Web page allocated by the IA for the company at issue, the latter may be identified, among other things, by a three-word unique word combination. The user may also be asked to take a photograph or upload images, audio, or videos recordings to the server as part of the complaint launching process. The camera on the user's device may be activated (by the user of remotely by the IA server) in order to enable the user to take and/or upload the images, videos, or other documents.

As discussed above, the IA server may seal the uploaded or transmitted user data, or encrypt it using a private/public key combination in order to limit the access or "seal" the records from access by anyone who does not obtain a proper authorization from a court or administrative agency that officially investigates the complaint. The "sealing" option is particularly critical in protecting the identity of minors, students, team players. It's also important to protect the identity of whistleblowers who report criminal activities that may carry significant penalties and confinement for the involved individuals and my impact the company's business (for example, reporting an environmental or a consumer law violation).

When processing user input, the IA server executes AI or computer server (on one or more computer processors), causing the server to evaluate presence of certain key words (for example, the words "abuse" or "sexual harassment"), and send an email, generate an automated call, or prepare a formal letter to the proper authorities. The choice of the correct authorities may be analyzed and determined based on the specific instructions and guidelines provided by the company, federal laws, state laws, local regulation, industry standards, and/or company policy.

In addition to processing the text, and searching for key words within the text, IA software may also execute code that "listens" and analyzes recorded speech and "listens" and identifies certain key phrases, the tone of voice and the overall context of the recorded conversation. It then performs the analysis based on this analysis. For example, the AI or software executing on the IA server may distinguish between the words spoken at a party from the same words that are spoken during a football practice or game, and may reach different conclusions or assign different priorities based on the context of the recorded video or audio.

As discussed, there are no currently known anonymous services (operated by an independent third party) where the offered system protects student athletes (or students in general). As discussed above, many recent articles point out to this deficiency and lack of proper resources in this area. Program officials, universities, and athletic programs may be too partial to properly implement the required services. One of the main goals of such self-implemented hotlines is that it often serves the main goal of protecting the institution (e.g., K-12, college, clubs, Olympics) rather than athletes and students. Any current reporting mechanism is either serving the university/program/school or is an internal mechanism for coaching certification. Furthermore, none of these systems provide anonymity.

In contrast, the present invention implements a completely anonymous reporting mechanism to ensure the safety of students (and student athletes). The platform is completely anonymous. Reporting someone anonymous is counterintuitive; it casts a shadow of doubt on the validity of the report. Using anonymous reporting mechanisms for athletes is not obvious nor seen as a logical solution to the problems that exist. On the contrary, coaches, teachers, and other adult supervisors are given countless hours of training and certifications.

IA also ensures its validity and removes an identity (IP or otherwise) of the victim. Users can select complete anonymity, or they can choose to divulge their name. The platform uses a text to cell/device feature as a validity check and has the option (user decision) to activate the device's camera. The user has the option to input data, information, dates, and include a photo. (For example, the personal private information may include the identification of "This is me, on this date, at this time, and I was bullied or harassed at this location, by this person." The record of the complaint is then sealed and can only be ordered to be opened or decrypted by the court of law or the governmental agency that investigates the complaint. Among many other benefits, the present invention ensures that all filings are sealed with several layers of security and data integrity checks.

Option 3—Reporting an Anonymous Complaint

Another possible option for the user selection is reporting an anonymous complaint through the IA automated system. After the user selects "I want to report a complaint anonymously", the user receives a confirmation that his or her anonymity will be secured and guaranteed. As with the Option 2, the user may be asked to provide a mobile telephone number in order to confirm the reliability/validity of the complaint. Similarly, the user receives a unit code/id/number on the mobile device and enters this number in the Web page that is utilized for the company on the IA server. The IP address and/or the user's phone number may be used by the IA server to confirm that the reliability/validity of the launched anonymous complaint meets the requirements and should be properly processed (i.e., blocking spammers and persons with low reliability/validity scores or metrics).

As with option (2), the user may activate his or her camera and upload and send videos, audio files and/or other documents. However, after processing the input received form the user, the IA server will immediately "seal" (for example, encrypt using the private/public keys or other encryption methods) the user data in order to secure the anonymity of the user. The IA software or AI may further remove any potentially identifiable information from the data that it may utilize for the aggregate data, overall analytics and reports send to the company or organization, or to the proper authorities. The "sealed" data can then be opened by the IA management after receiving a court order. In at least one embodiment, in order to unseal the "sealed" record, the CEO of the IA has to receive an order from the court that directs the IA to "unseal" the record.

In one example, a student athlete wants to submit an anonymous complaint about a college team coach. He or she uploads a video or audio file in which the team coach uses racial slurs. The video is transmitted from the student's mobile phone to the IA server, where it is processed. As part of the processing, the video is scrubbed and separated from any video data that contains any information that identifies the athlete. This "anonymous" (i.e., scrubbed) copy is sent to the college. The original video may be "sealed" by encryption. The information that does not identify the athlete remains in the "anonymous" copy. The original "sealed" copy is stored in a database by the IA server (in the encrypted format) and linked to the "anonymous" copy by a pointer or some identifier. The "sealed" copy is maintained in the encrypted state until a proper court order is provided to the IA, directing it to unseal the stored records.

One of the benefits of maintaining a direct link between the "sealed" and "anonymous" copy of the submitted complaint is that automatically connects the two files/reports through the automated mechanisms. It maintains the student athlete's personal details and account of the harassment incident(s) in a particular area or in a particular sport. At the same time, the anonymity of the user/complainant is fully protected. The connection between the two records allows the IA server and system to verify the facts and alert the arbitrators and state agencies who can assist the institution or organization with both immediate remedial actions and meaningful future changes.

In another example, a company employee wants to submit an anonymous complaint about certain sexual harassment incident that the employee observed. The same process steps are done by the IA server to "seal" the original report, removing names or the involved individuals, and the "anonymous" (i.e., data scrubbed of all PPI information, names, etc.) is used to generate a written and/or automatically generated report to the company. The original data records are encrypted and "sealed" until a proper court order or a subpoena from the DA Office is received.

Additional Examples of Situations When the Anonymous Complaint Launching Process may be Utilized In one example, an employee on the spectrum is constantly teased for her/his/their facial tics and mannerisms during staff meetings. Colleagues have a completely anonymous way to report the injustice without fear of retaliation by the aggressor. In another example, a hospital employee or patient observes the mistreatment of a patient by hospital staff.

In another situation, some persons of color in a company do not feel comfortable sharing their ideas when the entire leadership team in the company is white. The leadership team brings in a person of color to speak during the "Black History Month." This is thought to be extremely hurtful by the listeners and they felt unsafe, feeling it was a sense of tokenism rather than any meaningful action on a part of the company management. The present invention would allow the employees to voice their opinion and views anonymously and perhaps gain input into the decision prior to the scheduled presentation.

In another example, a COO of a company was put in charge of the operations, while the CEO travelled overseas on company business. The CEO continually received, "we miss you when you are not here" message from the COO. However, unbeknownst to him, the COO was bullying and harassing the company staff when the CEO was away on business travels. After the COO has bullied the seventh victim, the company had to hire a law firm to investigate the allegations resulting in 12 confirmed cases of harassment, bullying and intimidation; stories of staff members being belittled, left in tears, and many other incidents of inappropriate behavior by COO. In the meantime, the COO had to be put on a paid leave during investigation, and the company incurred significant attorney fee costs. The present invention addresses this situation much more efficiently and cost-effectively.

In view of the foregoing detailed description of various embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernible from the description herein by those of ordinary skill in the art. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention.

It should be appreciated that the present invention includes any and all possible combinations of the disclosed subject matter. Thus, even if a particular embodiment is not discussed as including a feature in a different embodiment, the present invention embodies such feature in any suitable embodiment, and accordingly such particular embodiment optionally includes said particular features of said different embodiment. Also, various steps or substeps may be omitted, and various additional steps and substeps may be added, as appropriate.

Unless otherwise stated, the singular includes the plural in further variations or embodiments, and the plural includes the singular in other further variations or embodiments of any particular described embodiment, feature, element, step or other thing mentioned herein.

It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

While certain exemplary aspects and embodiments have been described herein, many alternatives, modifications, and variations will be apparent to those skilled in the art. Accordingly, exemplary aspects and embodiments set forth herein are intended to be illustrative, not limiting. Various modifications may be made without departing from the spirit and scope of the disclosure. Such modifications and alternatives arrangements are not intended invention to be outside the scope of the present invention and are intended to be covered by it.

The invention title and abstract are not intended to limit the claimed invention or cover multiple embodiments and all various features of the claimed invention.

Having described the present invention including various features and variations thereof, it is intended that the appended claims be interpreted as including the embodiments described herein, the alternatives mentioned above, and all equivalents thereto.

What is claimed is:

1. A method for automatically processing online complaints and ideas, comprising:

submitting registration information about an entity from a user device having a computer processor to a processor on a server;

automatically creating or utilizing a computer-generated unique coding entry for the identification of the registered entity;

providing or receiving one or more key words for storage in a database associated with the registered entity;

receiving on the user device a selection request to enter an idea, launch a complaint with private personal identification (PPI) information or launch an anonymous complaint through a user interface;

transmitting through the user interface an input data from a user, comprising user selection in response to the request to enter the idea, launch the complaint with PPI information or launch the anonymous complaint;

transmitting through the user interface user input data that comprises the idea, the anonymous complaint or the complaint with PPI information;

providing data for a zone of reliability verification analysis on the user-transmitted data, said data comprising geographic location or an IP address of each user device of at least one specified user device of one or more users that are designated for the registered entity;

allowing the server to automatically verify geographic location or IP address of the user device that is transmitting the idea or launching the complaint;

providing an unsealing decision or order for verification, and instructions for unsealing or verification, and providing access to at least one dataset with PPI information for the submitted idea or complaint;

allowing access to said at least one dataset with PPI information and a linked dataset without PPI information;

receiving notification of one or more automatically generated reports to governmental entities, industry groups or independent organizations, wherein the generated reports take into account data in the accessed datasets; and receiving a rating score calculated for the registered entity as part of the engagement data;

automatically executing a data collection protocol that receives a Webpage with an entry space or a form to enter a date of the incident, a text box for data entry, and an option to upload images;

receiving and processing data collected from the user as part of the data collection protocol;

further receiving as part of the data collection protocol an option to activate a webcam to take and include an image of the user; and in response to an action of the user, transmitting the image of the user as part of the data collection protocol.

2. The method of claim 1, wherein the unique coding entry includes a three-standard-words combination, automatically created and provided for the identification of the registered entity in the automated zone of reliability verification analysis.

3. The method of claim 1, wherein the unique coding entry includes a three-standard-words combination, automatically created and provided for identification of the registered entity in entity registration, for receiving and processing communications from the user device and for reporting.

4. The method of claim 1, further comprising:
determining whether launching of the anonymous complaint is selected by the user, and, if so, then:
automatically removing the PPI information from the dataset transmitted from the user device if launching of the anonymous complaint is selected by the user;
encrypting the dataset with PPI information using one or more encryption key; and
linking the dataset with PPI information with the corresponding dataset where all PPI information is removed.

5. The method of claim 1, further comprising receiving multiple pricing options for different offered services, and transmitting information that reflects at least one selected pricing option and at least one selection of the offered services for the registered entity from the user device.

6. The method of claim 1, wherein the key word database associated with the registered entity further comprises special goals and objectives that the entity wants to improve, or one or more specific problems or challenges that the entity wants to address.

7. The method of claim 1, wherein the zone of reliability verification analysis of the received complaint data comprises confirming, by the processor on the server, the location of the user who provides complaint or idea data, based on verification of the IP address or zip code of the user to those previously provided for the entity.

8. The method of claim 1, further comprising:
transmitting an authorization to allow access to and control of an audio interface on the user device by the processor on the server for inputting the idea or complaint data from the user.

9. An automated system for processing online complaints and submissions, comprising:
at least one processor executing computer instructions stored in a tangible, non-transitory computer readable storage medium causing the processor to:
submit registration information about an entity from a user device having a computer processor to a processor on a server;
automatically create and utilize a computer-generated unique coding entry for the identification of the registered entity;
provide or receive one or more key words for storage in a database associated with the registered entity;
receive on the user device a selection request to enter an idea, launch a complaint with private personal identification (PPI) information or launch an anonymous complaint through a user interface;
transmit through the user interface an input data from a user, comprising user selection in response to the request to enter the idea, launch the complaint with PPI information or launch the anonymous complaint;
transmit through the user interface user input data that comprises the idea, the anonymous complaint or the complaint with PPI information;
provide data for a zone of reliability verification analysis on the user-transmitted data, said data comprising geographic location or an IP address of each user device of at least one specified user device of one or more users that are designated for the registered entity;
allow the server to automatically verify geographic location or IP address of the user device that is transmitting the idea or launching the complaint;
provide an unsealing decision or order for verification, and instructions for unsealing or verification, and providing access to at least one dataset with PPI information for the submitted idea or complaint;
allow access to said at least one dataset with PPI information and a linked dataset without PPI information;
receive notification of one or more automatically generated reports to governmental entities, industry groups or independent organizations, wherein the generated reports take into account data in the accessed datasets; and
receive a rating score calculated for the registered entity as part of the engagement data;
automatically executing a data collection protocol that receives a Webpage with an entry space or a form to enter a date of the incident, a text box for data entry, and an option to upload images;
receiving and processing data collected from the user as part of the data collection protocol;
further receiving as part of the data collection protocol an option to activate a webcam to take and include an image of the user; and
in response to an action of the user, transmitting the image of the user as part of the data collection protocol.

10. The system of claim 9, wherein the unique coding entry includes a three-standard-words combination, automatically created and provided for the identification of the registered entity in the automated zone of reliability verification analysis.

11. The system of claim 9, wherein the unique coding entry includes a three-standard-words combination, automatically created and provided for identification of the registered entity in entity registration, for receiving and processing communications from the user device and for reporting.

12. The system of claim 9, wherein the processor executes computer instructions that cause the processor to:
determine whether launching of the anonymous complaint is selected by the user, and, if so, then:
automatically remove the PPI information from the dataset transmitted from the user device if launching of the anonymous complaint is selected by the user;
encrypt the dataset with PPI information using one or more encryption key; and
link the dataset with PPI information with the corresponding dataset where all PPI information is removed.

13. The system of claim 9, wherein the processor executes computer instructions that cause the processor to receive multiple pricing options for different offered services, and transmit information that reflects at least one selected pricing option and at least one selection of the offered services for the registered entity from the user device.

14. The system of claim 9, wherein the key word database associated with the registered entity further comprises special goals and objectives that the entity wants to improve, or one or more specific problems or challenges that the entity wants to address.

15. The system of claim 9, wherein the zone of reliability verification analysis of the received complaint data comprises executing computer instructions by the processor on the server to verify the location of the user who provides complaint or idea data based on verification of the IP address or zip code of the user to those previously provided for the entity.

16. The system of claim 9, wherein the processor executes computer instructions that cause the processor to transmit an authorization to allow access to and control of an audio interface on the user device by the processor on the server for inputting the idea or complaint data from the user.

* * * * *